UNITED STATES PATENT OFFICE.

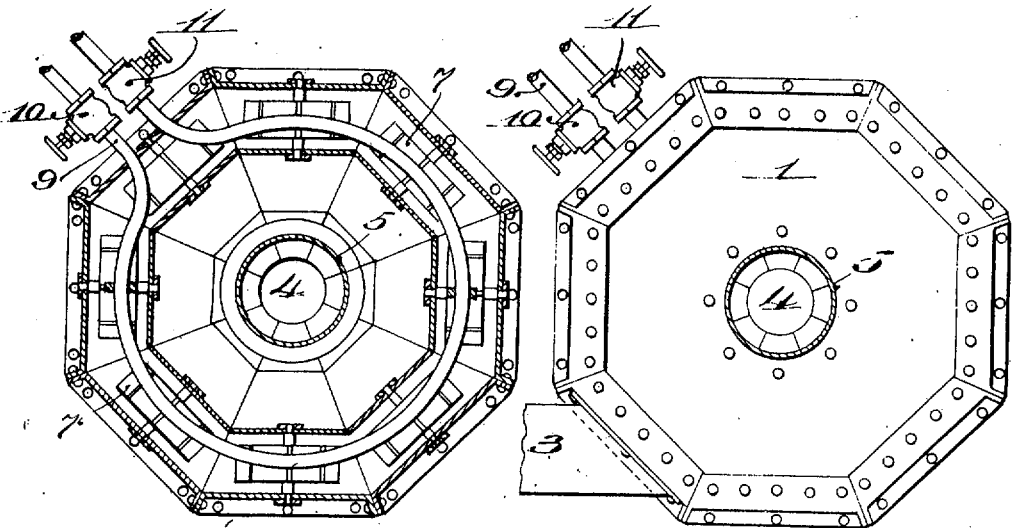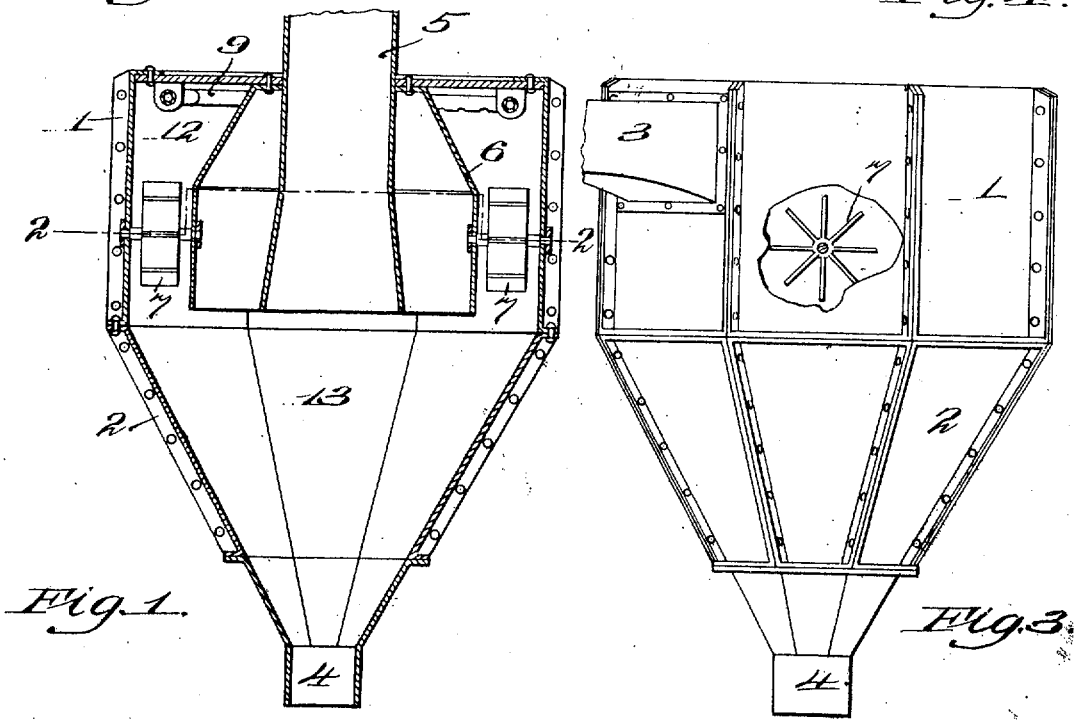

WILLIAM S. OSBORNE, OF HYDE PARK, MASSACHUSETTS, ASSIGNOR OF ONE-HALF TO B. F. STURTEVANT COMPANY, OF BOSTON, MASSACHUSETTS, A CORPORATION OF MASSACHUSETTS.

DUST-COLLECTOR.

No. 853,517.    Specification of Letters Patent.    Patented May 14, 1907.

Application filed December 28, 1905. Serial No. 293,571.

*To all whom it may concern:*

Be it known that I, WILLIAM S. OSBORNE, a citizen of the United States, residing at Hyde Park, in the county of Norfolk and State of Massachusetts, have invented certain new and useful Improvements in Dust-Collectors; and I do hereby declare the following to be a full, clear, and exact description of the invention, such as will enable others skilled in the art to which it appertains to make and use the same.

The present invention relates to an improvement in dust collectors.

The object of the invention is to produce a dust collector for such kinds of dust as are only with difficulty separated from the air or other gases in which they are entrained.

To this end the present invention consists in the dust collector hereinafter described and particularly defined in the claims.

In the accompanying drawings illustrating the preferred form of the invention Figure 1 is a sectional elevation, Fig. 2 is a sectional plan taken on the line 2—2 Fig. 1, Fig. 3 is a side elevation with a part broken away to show the interior, and Fig. 4 is a top plan.

In separating smoke particles, for example, from flue gases, it has been found that such particles are more easily separated when moistened, and that the separation is further facilitated by impact of the gases against surfaces. This is also true of leather dust and other dust formed of fine particles of light material.

According to the present invention the air from which the dust is to be separated is subjected to the action of a number of beaters which stir and beat the dust laden air and preferably also expose the air to the action of water or moisture, so that the solid matter in the air is dampened and thereby separated from the air with greater facility.

The dust collector illustrated in the drawings is described as follows:—The collector consists of an upper portion 1 which is prismatic in shape and a lower portion 2 which is pyramidal in shape. The upper portion is provided with a tangential inlet pipe 3 through which the incoming air enters the upper portion of the collector. The dust outlet 4 is at the bottom or apex of the lower portion, and the air outlet 5 is a tube extending from a point near the bottom of the upper portion through the center of the top thereof. Depending from the top, and about midway between the outlet 5 and the outer walls of the upper portion of the collector, is a hood 6, the upper part of which is contracted so as to afford a larger space hereinafter called the "inlet space," near the top of the collector. This hood is prismatic and corresponds in shape to the upper portion of the collector. Between the lower part of the hood 6 and the walls of the upper part of the collector are mounted a series of beaters 7 in the form of paddle wheels journaled to rotate freely. A water pipe 9 is fixed in the top of the collector and it extends around the collector entering at one side and emerging at the opposite side. A cock 10 affords means for shutting off and turning on the water when it is desired and a cock 11 at the other end of the pipe affords means for draining the pipe when it is desired to empty it. This pipe is provided with a number of small holes in its under side through which water may drop down upon the beaters 7.

The incoming dust laden air entering through the inlet 3 whirls around the periphery of the inlet portion of the collector and, by its impact with the upper blades, sets the beaters 7 in motion. These beaters, being moistened with the water dropping upon them from above, beat the air and moisten the particles of solid material carried thereby. The air then passes downward between the beaters and continues to whirl, with reduced velocity, in the lower or dust "separating" portion. The moistened particles, being heavier than if dry, are carried by centrifugal action toward the periphery of the collector and are thereby separated from the air. All of the air passing down through the upper part 12 to the lower part 13 of the collector passes around the wet beaters 7 and is subjected to the beating and moistening action and is thereby brought to a condition in which any solid matter not separated therefrom in the upper portion of the collector will be deposited on the walls of the lower portion.

While it is considered that the invention is best embodied in a construction employing the prismatic and pyramidal form as illustrated in drawings, because of the eddies which are formed at the corners and which, it is believed, assist in the separation of the solid matter from the air, still it is to be understood that the employment of a cylindrical construction is within the purview of the invention, and the invention is not limited in general to the details of construction and operation of the illustrated embodiment thereof, but it may be embodied in other and different forms within the scope of the following claims.

Having now described the invention, what is claimed is:—

1. A dust collector having, in combination, a casing provided with a tangential air inlet, a central air outlet, and a dust outlet, rotating means for beating and moistening the air in its passage through the collector, and means for supplying moisture to said rotating means, substantially as described.

2. A dust collector having, in combination, an inlet portion with a tangential air inlet, a dust separating portion, a contracted passage-way leading from one portion to the other, and rotating air beating means located in such passage-way, substantially as described.

3. A dust collector having, in combination, an inlet portion, a tangential air inlet, a dust separating portion, a contracted passage-way leading from one portion to the other, rotating air beating and moistening means in such passage, and means for supplying moisture to said beating and moistening means, substantially as described.

4. A dust collector having, in combination, a casing provided with a tangential air inlet, an air outlet, and a dust outlet, and a plurality of rotary beaters mounted about the periphery of the casing of axes perpendicular to the axis of the casing, substantially as described.

5. A dust collector having, in combination, an inlet portion provided with a tangential air inlet, a centrifugal dust separating portion connected with the inlet portion by a contracted passage-way, and rotating beaters located in the passage-way and actuated by the air passage therethrough, substantially as described.

6. A dust collector having, in combination, a casing provided with a tangential air inlet, a central air outlet, and a dust outlet, a rotating beater located in the casing and actuated by the air, and means for applying moisture to the beater to moisten the air, substantially as described.

7. A dust collector having, in combination, a casing provided with a tangential air inlet, a plurality of rotary beaters mounted about the periphery of the casing below the air inlet and in the path of the air as it circles about the casing, and a central air outlet below the beaters, substantially as described.

8. A dust collector having, in combination, a casing provided with a tangential air inlet, an air outlet, and a dust outlet, a plurality of rotary beaters mounted about the periphery of the casing of axes perpendicular to the axis of the casing, and means for applying moisture to the beaters, substantially as described.

In testimony whereof he affixes his signature, in presence of two witnesses.

WILLIAM S. OSBORNE.

Witnesses:
HORACE VAN EVEREN,
FRED O. FISH.